(12) United States Patent
Andre et al.

(10) Patent No.: US 12,547,255 B2
(45) Date of Patent: Feb. 10, 2026

(54) INPUT DEVICE FOR THREE-DIMENSIONAL CONTROL

(71) Applicant: Apple Inc., Cupertino, CA (US)

(72) Inventors: Bart K. Andre, Palo Alto, CA (US); Brian T. Gleeson, Mountain View, CA (US); Kristi E. Bauerly, Los Altos, CA (US); William D. Lindmeier, San Francisco, CA (US); Matthew J. Sundstrom, Campbell, CA (US); Geng Luo, Santa Clara, CA (US); Seung Wook Kim, San Jose, CA (US); Evangelos Christodoulou, Santa Clara, CA (US); Megan M. Sapp, San Francisco, CA (US); Kainoa Kwon-Perez, San Francisco, CA (US); John B. Morrell, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/472,185

(22) Filed: Sep. 21, 2023

(65) Prior Publication Data

US 2024/0103642 A1   Mar. 28, 2024

Related U.S. Application Data

(60) Provisional application No. 63/478,523, filed on Jan. 5, 2023, provisional application No. 63/376,767, filed
(Continued)

(51) Int. Cl.
*G06F 3/0346* (2013.01)
*G01P 13/00* (2006.01)
(Continued)

(52) U.S. Cl.
CPC .......... *G06F 3/03543* (2013.01); *G01P 13/00* (2013.01); *G01S 5/30* (2013.01);
(Continued)

(58) Field of Classification Search
CPC .... G06F 3/03543; G06F 3/016; G06F 3/0346; G06F 3/03544; G06F 3/03547;
(Continued)

(56) References Cited

U.S. PATENT DOCUMENTS

| | | | |
|---|---|---|---|
| 6,844,871 B1 | 1/2005 | Hinckley et al. | |
| 8,976,265 B2 * | 3/2015 | Marks ................. | G06F 3/017 381/92 |

(Continued)

FOREIGN PATENT DOCUMENTS

| | | | | |
|---|---|---|---|---|
| EP | 2581814 A1 * | 4/2013 | ............. | G06F 1/169 |
| GB | 2627854 B | 6/2025 | | |
| KR | 20090078604 A * | 7/2009 | | |

OTHER PUBLICATIONS

Translation of KR20090078604A (Year: 2009).*
(Continued)

*Primary Examiner* — Lixi C Simpson
(74) *Attorney, Agent, or Firm* — Dorsey & Whitney LLP

(57) ABSTRACT

A three-dimensional control system includes an input device, a computing device, and a tracking assembly. The input device can include an input sensor, an inertial measurement unit sensor, and an ultrasonic speaker. The tracking assembly can include a plurality of ultrasonic microphones and an inertial measurement unit disposed on or with the computing device. The plurality of ultrasonic microphones can include three microphones in a first plane and at least one other ultrasonic microphone disposed out of the first plane. The ultrasonic microphones can be configured to detect ultrasonic waves output by the speaker of the input
(Continued)

device and the computing device can triangulate the position of the input device relative to the computing device in space.

19 Claims, 9 Drawing Sheets

Related U.S. Application Data on Sep. 22, 2022, provisional application No. 63/376,756, filed on Sep. 22, 2022, provisional application No. 63/376,763, filed on Sep. 22, 2022, provisional application No. 63/376,650, filed on Sep. 22, 2022.

(51) Int. Cl.
| | | |
|---|---|---|
| *G01S 5/30* | (2006.01) | |
| *G06F 3/01* | (2006.01) | |
| *G06F 3/0354* | (2013.01) | |
| *G06F 3/038* | (2013.01) | |
| *G06F 3/044* | (2006.01) | |
| *G06F 3/04815* | (2022.01) | |

(52) U.S. Cl.
CPC ............ *G06F 3/016* (2013.01); *G06F 3/0346* (2013.01); *G06F 3/03544* (2013.01); *G06F 3/03547* (2013.01); *G06F 3/0383* (2013.01); *G06F 3/044* (2013.01); *G06F 3/04815* (2013.01); *G06F 2203/0337* (2013.01); *G06F 2203/0381* (2013.01); *G06F 2203/04104* (2013.01)

(58) Field of Classification Search
CPC .... G06F 3/0383; G06F 3/044; G06F 3/04815; G06F 2203/0381; G06F 2203/04104; G01P 13/00; G01S 5/30
See application file for complete search history.

(56) References Cited

U.S. PATENT DOCUMENTS

| | | |
|---|---|---|
| 2002/0060665 A1 | 5/2002 | Sekiguchi et al. |
| 2010/0039381 A1 | 2/2010 | Cretella et al. |
| 2012/0105207 A1 | 5/2012 | Trabucco et al. |
| 2015/0212598 A1 | 7/2015 | Lee |
| 2015/0249819 A1* | 9/2015 | Jiang .................... G06F 3/042 345/419 |
| 2016/0062488 A1* | 3/2016 | Zhao .................. G06F 3/03542 345/163 |
| 2016/0154240 A1* | 6/2016 | Lee .................... G02B 27/0093 345/8 |
| 2018/0088686 A1 | 3/2018 | Zuber et al. |
| 2019/0113966 A1* | 4/2019 | Connellan .......... G01C 21/1656 |
| 2019/0171302 A1* | 6/2019 | Su ........................ G06F 3/016 |
| 2021/0181863 A1* | 6/2021 | Gatson .................. G06F 1/1669 |

OTHER PUBLICATIONS

PCT International Search Report and Written Opinion for PCT International Application No. PCT/US2023/074963, mailed Dec. 7, 2023, 16 pp.

* cited by examiner

INPUT DEVICE FOR THREE-DIMENSIONAL CONTROL

CROSS-REFERENCE TO RELATED APPLICATION(S)

This claims priority to U.S. Provisional Patent Application No. 63/478,523, filed 5 Jan. 2023, and entitled "Input Device," to U.S. Provisional Patent Application No. 63/376,767, filed 22 Sep. 2022, and entitled "Variable Friction and Multi-Texture Mouse," to U.S. Provisional Patent Application No. 63/376,763, filed 22 Sep. 2022, and entitled "Multi-Mode Mouse," to U.S. Provisional Patent Application No. 63/376,650, filed 22 Sep. 2022, and entitled "Input Device for Three-Dimensional Control," and to U.S. Provisional Patent Application No. 63/376,756, filed 22 Sep. 2022, and entitled "Input Device with Adaptive Grip Orientation," the entire disclosures of which are hereby incorporated by reference in their entirety.

FIELD

The present disclosure relates generally to user input devices and systems. More particularly, the present disclosure relates to three-dimensional input device tracking systems and devices.

BACKGROUND

Recent advances in computing have enabled immersive user experiences including desktop gaming on personal computers, alternate and virtual reality interactive consoles, three-dimensional (3D) computer-aided design (CAD) software, high-resolution display screens, and so forth. However, the user input devices designed to enable users to manipulate and control displayed objects and visual elements of such systems, including objects represented three-dimensionally on display screens, are limited to input devices such as buttons and knobs that are not intuitive or reflective of actions being signaled by the user. For example, in CAD software used by engineers and designers to build virtual 3D objects, typical input devices such as computer mice and styluses only provide buttons, knobs, and two-dimensional (2D) position sensing to enable manipulation of the objects being designed. Users often find it unintuitive and difficult to manipulate objects in 3D environments using these 2D input devices for 3D space, which requires additional control functionalities for 3D object translation, zoom, rotating, slicing, and otherwise moving the object in 3D. The limited input and control capabilities of present input devices are therefore inefficient, difficult to learn, burdensome, and insufficient for 3D manipulation.

For these and other reasons, there is a persistent need for improvements to 3D input devices.

SUMMARY

In at least one example of the present disclosure, an input device can include an input sensor, a housing defining an internal volume, an inertial measurement unit (IMU) sensor disposed in the internal volume, and an ultrasonic speaker disposed in the internal volume.

In one example, the input sensor can include a touch detection sensor. In one example, the ultrasonic speaker is configured to output sound waves greater than about 20 kHz. In one example, the ultrasonic speaker is configured to output sound waves between about 20 kHz and about 80 kHz. In one example, the input device further includes a feedback module. In one example, the feedback module includes a haptic engine. In one example, the feedback module includes a light. In one example, the input device further includes an emitter electrically coupled to the IMU sensor. In one example, the emitter is configured to send signals comprising information regarding a motion or an orientation of the input device detected by the IMU sensor.

In at least one example of the present disclosure, a tracking device includes a display portion secured to a base, the display portion having a display screen, an array of ultrasonic microphones disposed on the display portion, and a sensor (e.g., an IMU or angle sensor) disposed on the display portion and configured to detect an angle of the display screen relative to the base.

In one example, the ultrasonic microphone array includes three microphones defining a first plane and a fourth microphone disposed out of the first plane. In one example, the display screen defines a second plane parallel to the first plane. In one example, the display portion is a first portion and the tracking device further includes a second portion rotatably secured to the first portion and the fourth microphone is disposed on the second portion. In one example, the second portion includes a keyboard. In one example, the angle includes the angle of the display screen relative to a major plane of the second portion.

In at least one example of the present disclosure, a three-dimensional (3D) control system includes an input device, a computing device, and a tracking assembly. The input device can include an input sensor, an inertial measurement unit (IMU) sensor, and an ultrasonic speaker. The tracking assembly can include three ultrasonic microphones fixed to the computing device, the three ultrasonic microphones configured to receive ultrasonic waves output by the ultrasonic speaker.

In one example, the three-dimensional control system includes a display portion having a display screen. In one example, the IMU sensor is a first IMU sensor and the 3D control system further includes a second IMU sensor secured to the display portion. In one example, the tracking assembly includes at least four ultrasonic microphones, a first microphone, a second microphone, and a third microphone of the four ultrasonic microphones define a first plane, and a fourth microphone of the four ultrasonic microphones of the four ultrasonic microphones is disposed out of the first plane. In one example, the input device includes an emitter configured to send signals including information regarding motion detected by the IMU sensor to the computing device. In one example, the three dimensional-control system includes a laptop computer and the input device is operable as a mouse for the laptop computer.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
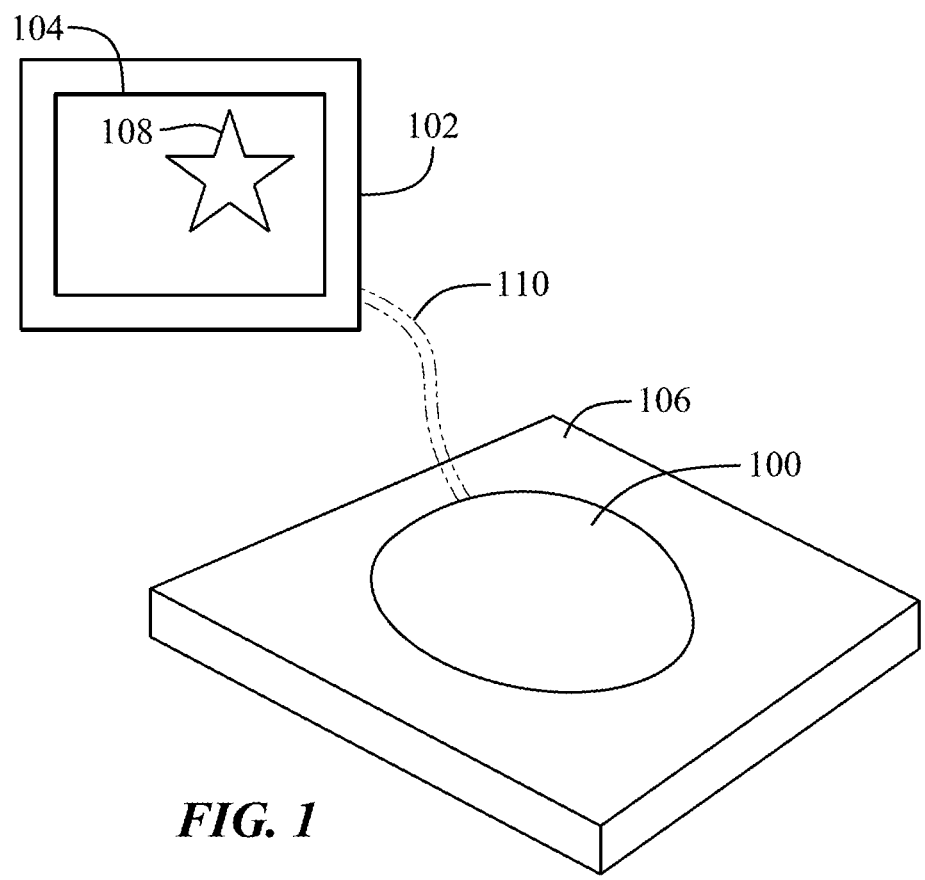
FIG. 1 shows an example of an input device on a support surface and a visual object on a display device controlled by the input device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

This disclosure relates to generally to user input devices and systems and more particularly to 3D input device tracking systems and devices. The devices and systems described herein can include user manipulated input devices and computing devices configured to detect the input device being manipulated in 3D space. As the user manipulates the input device in 3D space, the computing device can detect the position, movement, and orientation of the input device and correspondingly manipulate a representation of a 3D object on a screen of the computing device. In this way, the user can naturally and intuitively manipulate a 3D object represented on a screen by manipulating the input device in 3D space as if the input device itself was the object being represented on the screen.

In at least one example, a 3D control system can include an input device having an input sensor, an inertial measurement unit (IMU) sensor, and an ultrasonic speaker. The system also includes a tracking assembly having three or more ultrasonic microphones fixed to a computing device. In at least one example, the tracking assembly includes four ultrasonic microphones with one of the ultrasonic microphones positioned out-of-plane from the three others.

While the user moves the input device in 3D space, the ultrasonic speaker thereof can send audio signals which are imperceptible to the human ear to be received by the ultrasonic microphones of the tracking assembly. In at least one example, the input device and the tracking assembly are synchronized using bi-directional signals from a transceiver. Using the audio signals from the input device received by the tracking assembly, the computing device can determine a 3D position of the input device relative to the microphones (e.g., Cartesian or radial coordinates of the input device relative to an origin point). In addition, the input device can be configured to send signals relating to the orientation and movement detected by the IMU of the input device. Between the position information provided by the signals sent from the speaker of the input device and the signals sent regarding the IMU information, the system can accurately detect the 3D position, movement, and orientation of the input device relative to the computing device.

Accordingly, as the input device is manipulated by the user in physical, tangible 3D space, the computing device can correspondingly manipulate a 3D represented visual object on a display screen. In this way, the user can manipulate the visual object on the display screen using the input device as if the input device itself was the object on the display screen. This enables intuitive and natural control of object on the display screen where a rotation, translation, or other movement of the input device directly correlates to the same rotation, translation, or other movement of the visual object on the screen.

In addition, the input sensor or sensor array of the input device can be used to detect hand positions, squeezing forces, or other gestures performed by the user with the input device to expand the control capabilities of the input device when controlling the object on the screen. In one example, the input sensor can detect a magnitude of force with which the user squeezes the input device. When such a force passes a predetermined threshold, the computing device can then begin to manipulate the visual object on the screen as the user manipulates the input device in 3D space. Before this threshold is met, the computing device can ignore the position and orientation of the input device. In this way, the user can decide to "grab" the visual object (using the input device as proxy) by squeezing the input device. This squeezing is akin to the natural action one would take to actually grab the virtual object displayed on the screen. In this way, the action of grabbing and then manipulating the object on the screen is done naturally and intuitively with a physical input device in the hand of the user.

Additional actions or gestures performed by the user with the input device can also be detected and used to manipulate the object presented on a screen of the computing device in natural and intuitive ways. For example, the user can move the device closer to or further away from the display screen of the computing device to zoom in and out of the displayed object. Other gestures, hand positions, or actions performed with the input device can control the visual object in other ways, including panning left and right, selecting and deselecting objects, and any other useful 3D manipulation control of a 3D object represented on a screen.

In at least one example, the IMU sensor of the input device, or other sensors thereof, can detect when the user picks the input device up off of a support surface. Upon lifting the input device, the input device can enter a 3D mode where 3D positioning and movement is detected and utilized. Otherwise, when the input device is still resting or being moved across only two dimensions on a support surface (such as by moving across a substantially planar desktop or mousepad), the input device can function as a computer mouse operating in 2D but with enhanced capabilities due to additional input sensors, IMU sensors, ultrasonic speakers, and so forth. Thus, when controlling applications not requiring 3D manipulation of objects on screens, the user can rest the input device on a support surface. Then, when an application or software program utilizing 3D space and movement or design of objects is used, the user can simply lift the input device off the support surface or desktop and seamlessly switch to 3D control mode wherein the input device is manipulated in 3D space to control the 3D object on the screen, as described above.

Accordingly, devices and systems described herein provide natural, intuitive, and enhanced control of 3D objects represented on a display screen.

These and other embodiments are discussed below with reference to FIGS. 1-14B. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an example of the device 100 resting on a support surface 106. In at least one example, the input device 100 can be a computer mouse. The input device 100 can be configured to manipulate a visual object 108 displayed on a display screen 104 of a display device 102. The display device 102 can include a computing device such as a desktop computer, laptop computer, or tablet computer. An electrical connection 110 between the input device 100 and the display device 102 is illustrated in broken lines to show that some embodiments of the input device 100 can be hardwired to the display device 102 and other embodiments of the input device 100 can wirelessly connect with the display device 102 in order to visually manipulate the visual object 108 on the display screen 104.

The display device 102 can be a computing device configured to run software applications that display visual information to the user. The visual object 108 shown in FIG. 1 is a representative, non-limiting example of an image whose movement on the display screen 104 can be controlled to correlate to a movement of the input device 100 on the support surface 106. The visual object 108 can be a cursor in some examples. In other examples, the visual object 108 can include a gaming character or a 3D part or assembly being visualized and/or designed using CAD software. As the user moves the input device 100 across the support surface 106 on which the input device 100 rests, the visual object 108 can move across the display screen 104 in like manner.

The support surface 106 can include any surface on which the input device 100 can rest and be slid across during use. In one example, the support surface 106 includes a top surface of a mousepad. In another example, the support surface 106 can include the top surface of a desk, counter, or table including various materials.

In at least one example, the visual object 108 on the display screen 104 can be a 3D representation on a 2D display screen 104. 3D represented visual objects such as visual object 108 can be displayed on a two-dimensional display screen 104 while appearing three-dimensional as displayed by software applications including CAD software, gaming software, or other software applications including web browsers, visual design software, and so forth. The input device 100 can be configured to manipulate the 3D visual object 108 as the input device 100 rests on the support surface 106 but also as the input device 100 is lifted off the support surface 106 and manipulated 3D in space. The input device 100 can be manipulated by the user to mimic the desired manipulation of the visual object 108 as if the input device 100 was the visual object 108 in reality. In this way, the input devices and 3D tracking systems of the present disclosure can provide intuitive and natural control environments for users manipulating visual objects represented as 3D objects on a screen.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2:
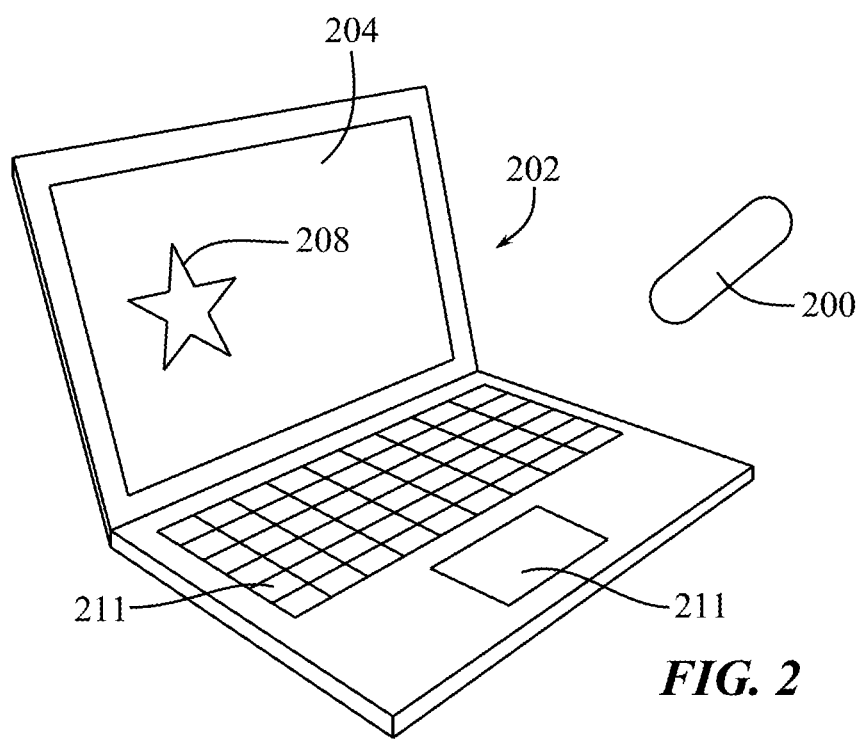
FIG. 2 shows an example of an input device manipulated in space relative to a display device to control a visual object on a display screen of the display device.

FIG. 2 illustrates another example of an input device 200 configured to control the visual object 208 displayed on a display screen 204 of a laptop computer 202. The laptop computer 202 is one example of an interface, input device, or display device that can interface with and be controlled in part by the input device 200 as the input device 200 is manipulated by a user. In at least one example, the laptop computer 202 can include additional input devices 211 such as a trackpad and a keyboard. As described above with reference to the visual object 108 in FIG. 1, the visual object 208 in FIG. 2 can also include a 3D represented visual object manipulatable by the user via the input device 200.

In at least one example, the input device 200 can include a stylus or other remote control input device or controller electrically coupled with the laptop computer 202 such that input commands from the user can be transmitted from the input device 200 to the laptop computer 202 in order to manipulate visual object 208, navigate menus or other graphical user interface (GUI) elements, or provide cursor or typing input, among other things. In at least one example, the input device 200 shown in FIG. 2 can be similar or the same as the input device 100 shown in FIG. 1 but where the input device 200 shown in FIG. 2 has been lifted off of any support surface, such as a support surface 106 shown in FIG. 1, and held in the air by the user.

In at least one example, the input device 200 can include one or more components configured to communicate with the laptop computer 202. The laptop computer 202 can include one or more components configured to receive signals sent from the input device 200 and detect the position, movement, and orientation of the input device 200 as the user manipulates the input device 200 in 3D space. Based on the detected position, movement, and orientation of the input device 200, the laptop computer 202 can correspondingly display manipulation of the visual object 208 on the display screen 204. Accordingly, the devices and systems described herein, including the input device 220 FIG. 2, can be held and manipulated in 3D space apart from any support surface in order to naturally and intuitively control and manipulate the visual object 208 in a simulated 3D space projected by the display screen 204.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3A:
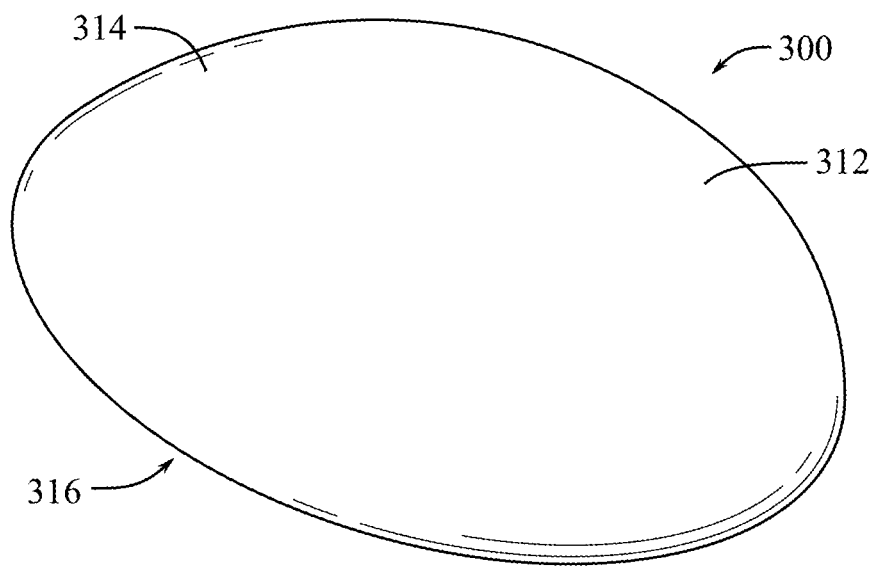
FIG. 3A shows a top, perspective view of an example of an input device.
Figure 3B:
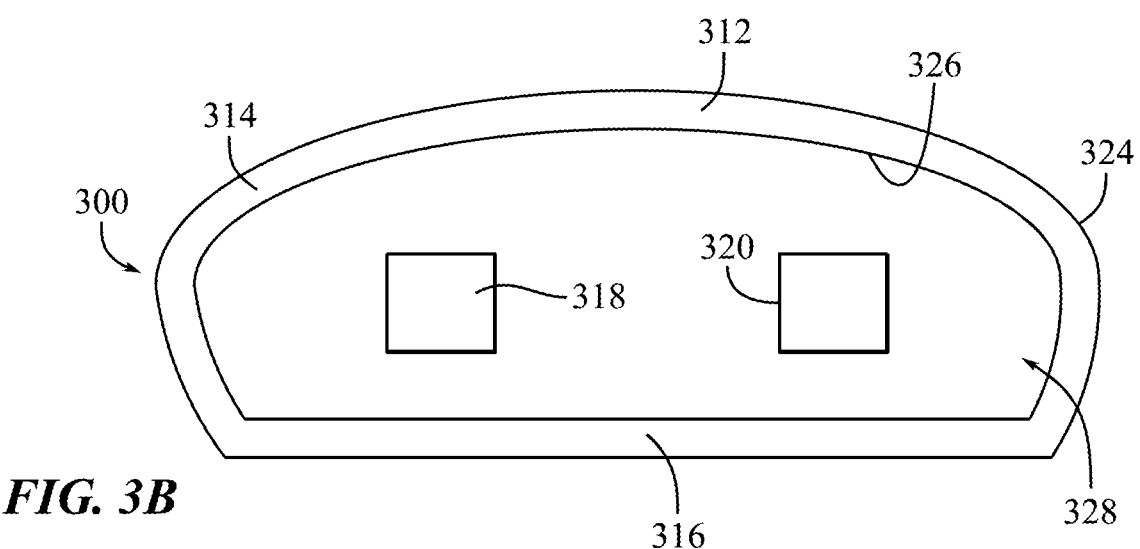
FIG. 3B shows a cross-sectional view of the device of FIG. 3A.

FIGS. 3A and 3B illustrate a top perspective view and a cross-sectional view, respectively, of another example of an input device 300. The input device 300 can include a housing 312 defining a grip portion 314 and a lower portion 316. The cross-sectional view of FIG. 3B shows the housing 312 can include an interior surface 326 opposite an exterior surface 324. The interior surface 326 can define an internal volume 328. In at least one example, the input device 300 can include an IMU sensor 318 and an output component 320. The output component 320 can be configured to send one or more signals to a computing device, including the laptop computer 202 shown in FIG. 2 and/or the display device 102 shown in FIG. 1.

In at least one example, the output component 320 can include a speaker. The speaker can be an ultrasonic speaker configured to output sound waves in the ultrasonic spectrum. That is, the output component 320 can include an ultrasonic speaker configured to produce ultrasonic waves that are inaudible to human ears. In general, these ultrasonic waves can include frequencies generally exceeding 20 kHz. In at least one example, the ultrasonic waves can include frequencies between about 20 kHz and about 80 kHz. In this way, the output component 320 including an ultrasonic speaker can send audio signals imperceptible to the human ear but detected by one or more ultrasonic microphones of a computing device.

Any of the features, components, and/or parts, including the arrangements and configurations thereof shown in FIGS. 3A-3B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3A-3B.

Figure 4:
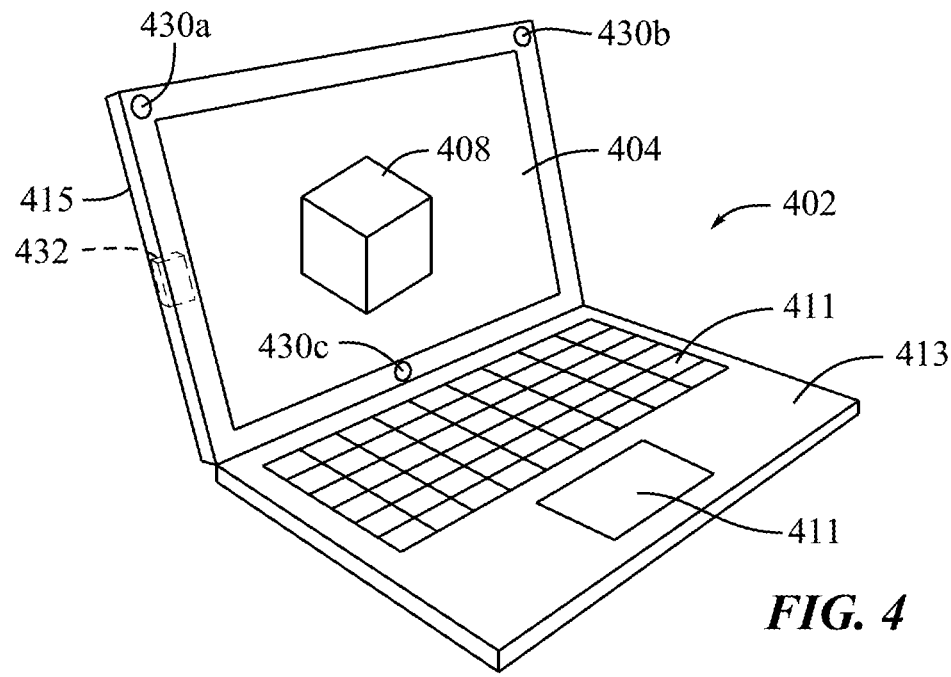
FIG. 4 shows a perspective view of an example of a tracking device.

FIG. 4 illustrates a perspective view of a tracking device 402, which can include a computing device such as a laptop or tablet computer as illustrated in FIG. 1 or 2. The tracking device 402 can be part of a 3D tracking system to detect a position in 3D space of an input device configured to control or manipulate a visual object 408 on a display screen 404 of the tracking device 402. The tracking device can also include other input components 411 such as a keyboard and touchpad. The visual object 408 shown in FIG. 4 displayed on the display screen 404 can represent a 3D object on a 2D screen such as those represented by CAD software, 3D gaming software, and so forth.

In at least one example, the tracking device 402 can include one or more ultrasonic microphones 430a, 430b, and 430c. The various microphones 430a, 430b, and 430c can be collectively referred to as microphones 430 or microphone array 430. Microphones 430 can be configured as ultrasonic microphones, as noted above, such that the microphones 430 are configured to detect ultrasonic waves exceeding 20 kHz or waves between about 20 kHz and about 80 kHz. In this way, the microphones 430 of the tracking device 402 can be configured to receive signals output by the output component 320 of an input device 300 shown in FIGS. 3A and 3B.

In at least one example, three separate microphones 430a, 430b, 430c can be disposed apart from one another at various locations on the tracking device 402, for example peripherally surrounding the display screen 404. The illustrated configuration and placement of the microphones 430 in FIG. 4 are exemplary only and not meant to be limiting. Other positions can also be used such that the microphones 430 are able to triangulate the three-dimensional, spatial position of the input device emitting ultrasonic waves based on the positions of the microphones 430a, 430b, and 430c and the signals received by the microphones 430a-c from the input device. In at least one example, the tracking device 402 can include a processor electrically coupled with the microphones 430. The processor can be configured to execute instructions stored on memory component including one or more algorithms to triangulate the position of an input device of outputting ultrasonic waves detected by the microphones 430.

In such an example, the position of the input device can be detected based on its proximity to the various microphones 430a, 430b, and 430c of the microphone array 430 shown in FIG. 4. As ultrasonic waves are detected by the various microphones 430a, 430b, 430c of the microphone array 430 shown, the processor can execute the algorithm to determine where the input device is in space based on the distance of the input device relative to each individual microphone 430a, 430b, 430c by measuring the time-of-flight of the ultrasonic waves transmitted from an ultrasonic speaker (e.g., output component 320 shown in FIG. 3A) of an input device.

In addition, in at least one example, the tracking device 402 can include an IMU sensor 432. In at least one example, the tracking device 402 can include a laptop computer having a base portion 413 and a display portion 415 rotatably secured to the base portion 413. The user can adjust the angle of the display portion 415 relative to the base portion 413 or the angle of the display screen 404 relative to a major plane of the base portion 413. The angle at which the display portion 415 is disposed can affect the triangulation algorithm for determining a position of an input device relative to the microphones 430. Accordingly, the tracking device 402 can include the IMU sensor 432 to detect the angle of the display portion 415 relative to the base portion 413. The algorithm can take into account this angle to accurately determine a position of input device regardless of varying angles of the display portion 415. More detail regarding the triangulation and detection of the position of an input device relative to the tracking device 402 will be given below with reference to other figures.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5:
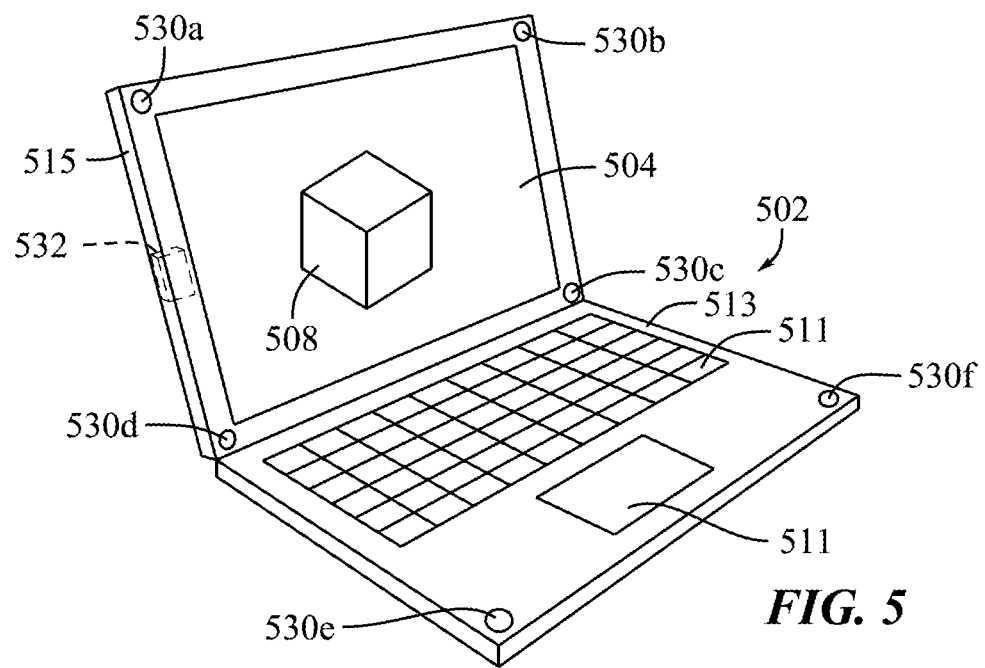
FIG. 5 shows a perspective view of an example of a tracking device.

FIG. 5 illustrates another example of a tracking device 502 including a base portion 513 and the display portion 515 rotatably connected to the base portion 513. The display portion 516 can include a display screen 504 showing the visual object 508 represented as a 3D object to be moved, controlled, and manipulated by an input device as described herein. The base portion 513 can include additional input components 511 including a keyboard and touchpad. Similar to the tracking device 402 shown in FIG. 4, the tracking device 502 shown in FIG. 5 can include an IMU sensor 532 disposed on or in the display portion 515 to compensate for the angle of the display portion 515 relative to the base portion 513 as a triangulation algorithm stored on a memory component is executed by a processor of the tracking device 502.

In another example, the tracking device 502 includes an angle position sensor in the clutch or hinge of the tracking device 502 between the base portion 513 and the display portion 515 or in other location that senses the angle of opening between the base portion 513 and the display portion 515 in any increment between a fully closed position (e.g., a closed clamshell position) to a fully open position (flat). The output of the angle position sensor can be used as an input for the triangulation algorithm(s) described herein.

In addition, the tracking device 502 can include a microphone array including individual microphones 530a, 530b, 530c, 530d, 530e, and 530f. The individual microphones 530a, 530b, 530c, 530d, 530e, and 530f can be referred to collectively as microphones 530 or microphone array 530. The microphones 530 can be ultrasonic microphones configured to detect ultrasonic waves. In at least one example, the tracking device 502 includes four microphones 530a-d disposed in a single plane and spaced apart surrounding the display screen 504. In addition, at least one example of the tracking device 502 can include one or more additional microphones 530e and 530f disposed out of plane of the microphones 530a-d disposed on the display portion 515. In at least one example, the additional microphones 530e and 530f are disposed on the base portion 513.

In one or more other examples, the number, placement, and plane or configuration of the microphone array 530 can vary. FIG. 5 illustrates one example for illustrative and explanatory purposes but is not meant to be limiting. In general, tracking devices and the 3D tracking systems described herein can include at least 3 microphones and a single plane (any three microphones are by definition in the same plane) and at least one other microphone disposed out of plane of the other 3. Some examples can include four or five microphones in a single plane and three or four microphones disposed in a second plane nonparallel to the first plane. Other examples can include three microphones in a single plane and one microphone out of plane of the other three. One will appreciate the number configurations of in and out of plane microphones of a microphone array, similar to the microphone arrays 430, 530 shown in FIGS. 4 and 5, are possible to enable triangulation of an input device manipulated in 3D space. Thus, the number and positioning of the microphones 530 can ensure that at least four microphones are arranged in a manner that prevents their three-dimensional positions in space from being considered coplanar. This can improve the accuracy of the microphone array's detection of the input device and triangulation capability.

Figure 6:
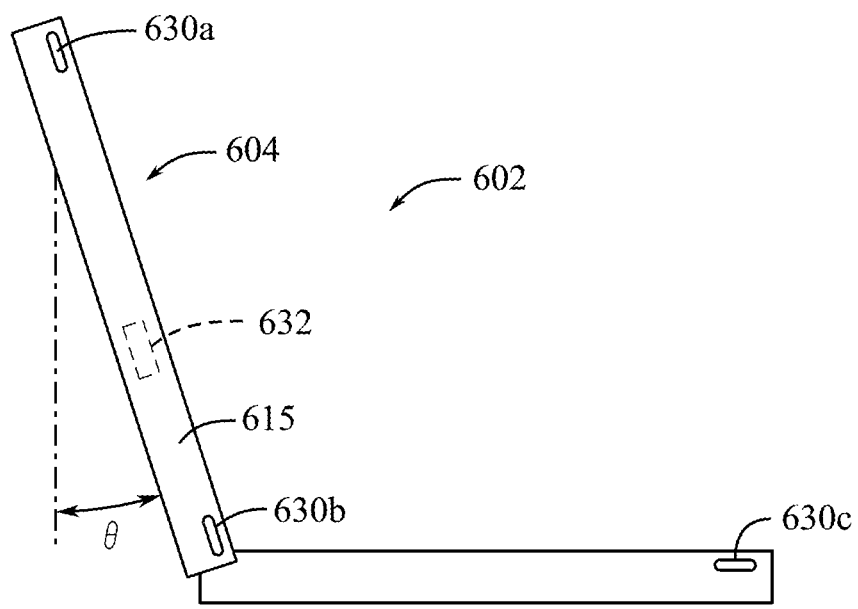
FIG. 6 shows a side view of an example of a tracking device.

FIG. 6 illustrates a side view of another example of a tracking device 602 in the form of a laptop computer having a base portion 613 and a display portion 615 rotatably connected to the base portion 613 at an angle θ. Like other tracking devices described in shown herein, the tracking device 602 of FIG. 6 can include a number of microphones 630a, 630b, 630c collectively referred to as microphone array 630 or microphones 630. The first and second microphones 630a and 630b can be disposed in the same plane and the third microphone 630c can be disposed out of the plane. For instance, the system can be preconfigured with information indicating that microphones 630a and 630b are coplanar in a vertical YZ plane and with information indicating the microphone 603c is offset from the YZ plane (e.g., in an X direction) by a predetermined distance. Thus, three microphones, in combination with this preconfigured information, can be used to triangulate a position of an input device relative to the tracking device 602. In addition, the tracking device 602 can include an IMU sensor 632 to detect the angle θ of the display portion 615 relative to the base portion 613.

The microphones 630 can be ultrasonic microphones configured to receive and detect ultrasonic waves output by an input device being tracked by the tracking device 602. The tracking device 602 can also include a display screen 604 of the display portion 615 configured to display a visual object in two dimensions but projected in a virtual three-dimensional scene.

Any of the features, components, and/or parts, including the arrangements and configurations thereof shown in FIGS. 5 and 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5 and 6.

Figure 7:
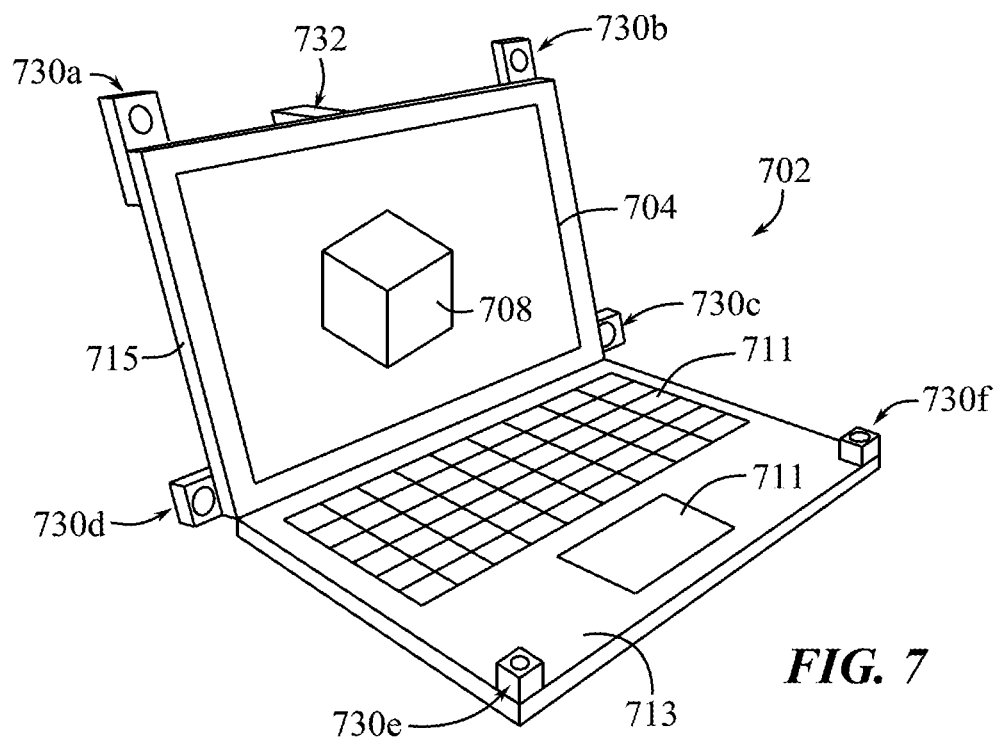
FIG. 7 shows a perspective view of an example of a computing device and a tracking assembly fixed to the computing device.

FIG. 7 illustrates another example of the tracking device 702 including a base portion 713 having input components 711 such as a keyboard and a touchpad. The tracking device 702 can also include a display portion 715 having a display screen 704 configured to display a visual object 708. The tracking device 702 can include a microphone array 730 including individual microphones 730a-F, similar to the tracking devices 502 shown in FIG. 5. However, the tracking device 702 shown in FIG. 7 can include removably attachable microphones 730a-f and/or a removably attachable IMU sensor 732 connected to the display portion 715.

In the illustrated example of FIG. 7, the microphone array 730 can be removed and attached to the tracking device 702 such that the microphone array 730 can be attached to devices other than the tracking device 702, such as a desktop computer, laptop computer, or tablet computer. In at least one example, each individual microphone 730a-f, as well as the IMU sensor 732, can be removably attached to the tracking device 702. In another example, any two or more of the microphones 730a-f of the microphone array 730, including all the microphones 730a-f, can be secured together and removably secured to the tracking device 702. In other examples, such as other examples shown herein, such as devices shown in FIGS. 4-6, the microphones and IMU sensors can be built into the tracking devices such that they are not meant to be removed during normal, intended use thereof.

While the tracking devices, computing devices, and display devices described herein include microphone arrays including ultrasonic microphones, other examples can include microphones configured to detect sound waves in frequencies other than ultrasonic frequencies. In general, the microphones of tracking devices described herein are configured to detect sound waves output by output components of input devices used to control the tracking device. These sound waves can be in a variety of different spectrums, including those below about 20 kHz and those above about 80 kHz.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

Figure 8:
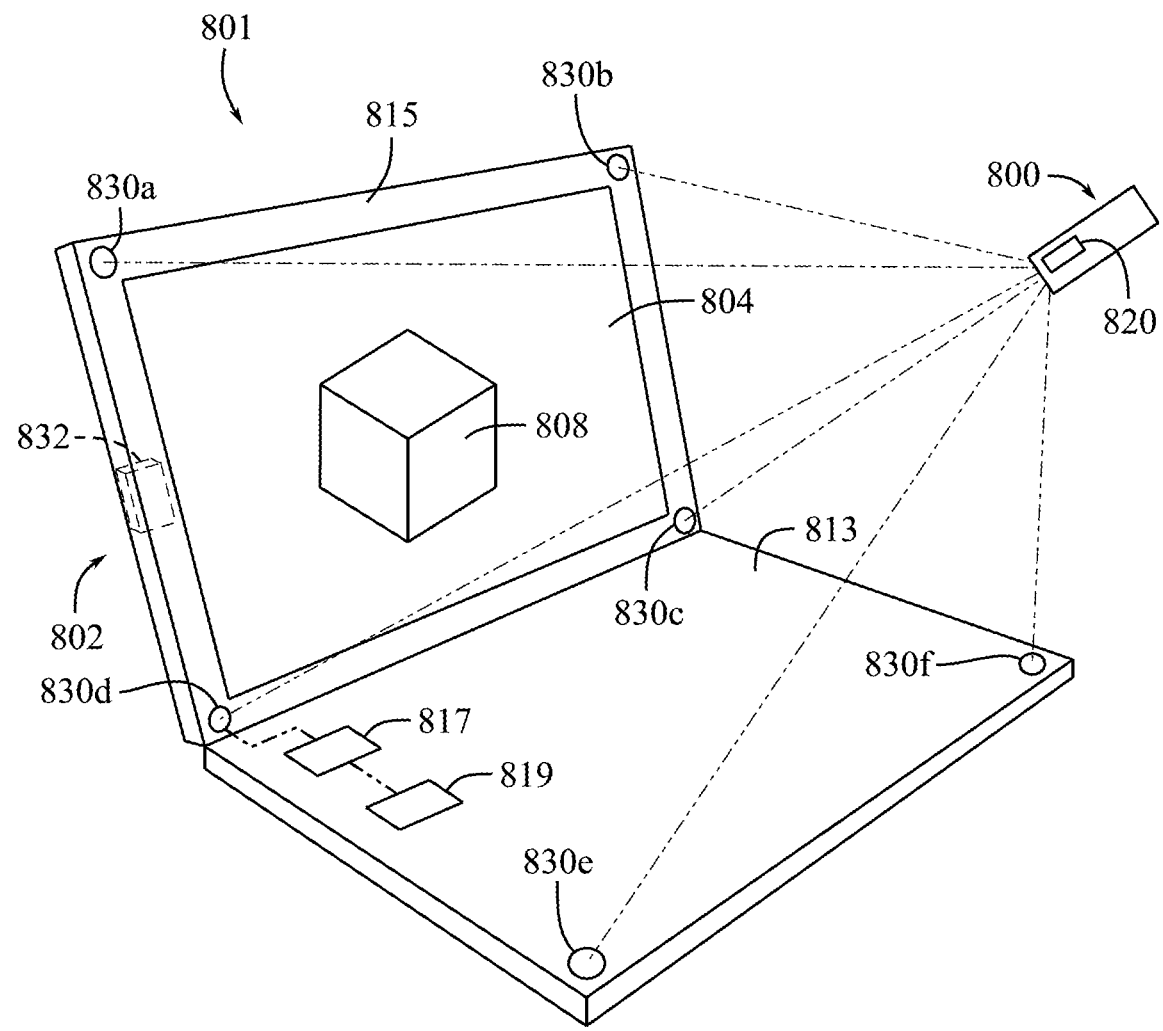
FIG. 8 shows an example of an input device detected in 3D space by a computing device as the input device controls a visual object on the display screen of the computing device.

FIG. 8 illustrates an example of a 3D control system 801 including an input device 800 and a tracking device 802. In the illustrated example of FIG. 8, the tracking device 802 can include a laptop computer having a base portion 813 and a display portion 815 rotatably connected to the base portion 813. The tracking device 802 can also be referred to as a computing device 802 as illustrated in the example of FIG. 8. The display portion 815 of the computing device 802 includes a display screen 804 displaying the visual object 808 to be manipulated by a user via the input device 800. As shown, the input device 800 can be configured to be held in the air without resting on any support surfaces as the user manipulates the input device 800.

In at least one example, the computing device 802 can include a plurality of microphones 830a-f, which can also be referred to as a microphone array 830 or simply as microphones 830. At least four microphones 830 a-d can be disposed on or with the display portion 813 in a first plane. The display screen 804 of the display portion 815 can also define a plane parallel to the plane defined by the microphones 830 a-d. In addition, the example shown in FIG. 8 includes two microphones 830 e and 830f disposed on or with the base portion 813. As such, the two microphones 830e and 830f of the base portion 813 can be out of plane of the plane formed by the four microphones 830a-d of the microphone array 830. As noted above, each of the microphones 830a-f of the computing device 802 can be ultrasonic microphones configured to detect ultrasonic waves admitted by the input device 800.

Along these lines, the input device 800 can include a speaker 820 such as an ultrasonic speaker 820 configured to emit ultrasonic waves detectable by the microphones 830 of the computing device 802. The computing device 802 can also include an IMU sensor 832 on, within, or otherwise coupled with the display portion 815. The IMU sensor 832 can be configured to detect and angle of the display portion 815, or the display screen 804, relative to the base portion 813. The input device 800 of the system 801 shown in FIG. 8 can include any or all of the features and components of other input devices shown in any other figure described herein. Similarly, the computing device 802 can include any or all of the features and components of other computing devices, tracking devices, display devices, and so forth shown in other figures described herein.

FIG. 8 illustrates the system 801 showing the position of the input device 800 detected by the computing device 802 using the microphone array 830. In particular, the dotted lines of FIG. 8 can represent ultrasonic waves admitted by the ultrasonic speaker 820 of the input device 800 as the waves travel to each individual ultrasonic microphone 830a-f of the computing device 802. As noted above with reference to other examples, the computing device 802 can include one or more processors 817 and one or more memory components 819 storing executable instructions including instructions for executing a triangulation algorithm. The processor 817 can execute the triangulation algorithm based on inputs received from the microphones 830 a-f to determine a position of the input device 800 in space, including the position over time for detecting movements of the input device 800.

The triangulation algorithm executed by the processor 817 can determine a position of the input device 800 relative to the display screen 804 based at least in part on a difference in the ultrasonic wave signals emitted by the ultrasonic speaker 820 of the input device 800, which may vary for each microphone 830 a-f based on a physical distance of the input device 800 from each microphone 830 a-f. The algorithm can also take into account the signal from the IMU sensor 832 and the angle of the display screen 804 relative to the base portion 813 as the user adjusts the display portion 815 relative to the base portion 813. Along these lines, in at least one example of the computing device 802, the processor 817 and the memory component 819 can be electrically coupled to each of the microphones 830 a-f and the IMU sensor 832.

Any of the features, components, and/or parts, including the arrangements and configurations thereof shown in FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8.

Figure 9:
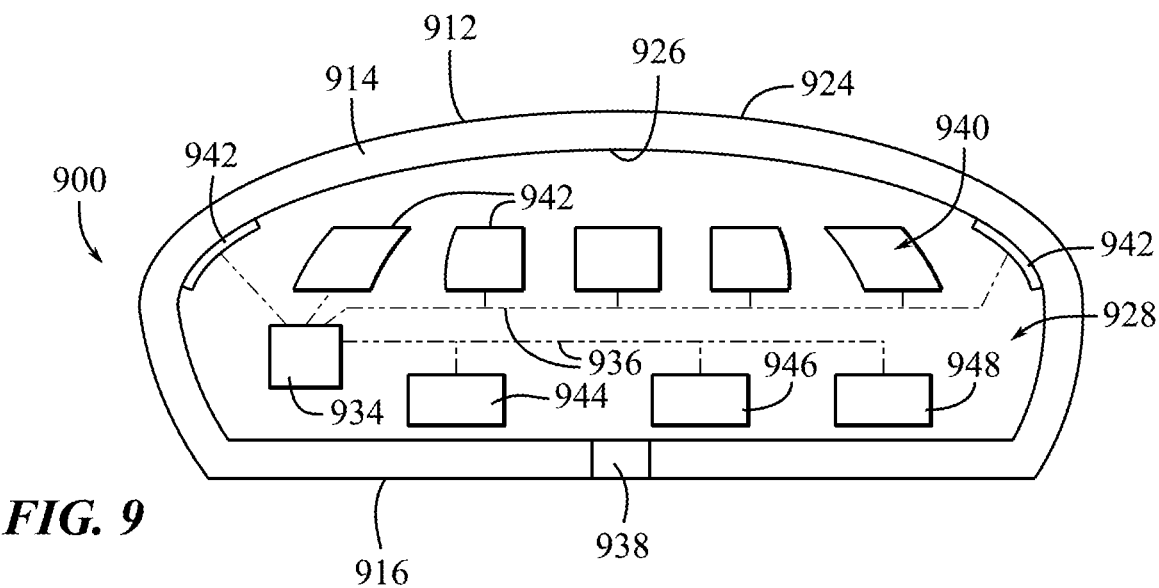
FIG. 9 shows a cross-sectional view of an example of an input device.

FIG. 9 illustrates a cross-sectional view of an example of an input device 900 that can be used in 3D tracking systems described herein. In the example shown in FIG. 9, the input device 900 can include a housing 912 having a grip portion 914 and a lower portion 916. The housing 912 can include an interior surface 926 and an exterior surface 924. The interior surface 926 can define an internal volume 928 to house or accommodate a number of other components. These other components can include an input sensor array 940, a feedback module 944, an antenna 946, and any other electronic components 948. A processor 934 can be electrically coupled to any one of these other electronic components via one or more wires or circuitry 936 represent a by dotted lines in FIG. 9. The input device 900 can also include a visual sensor 938 disposed with the lower portion 916 to track movement and position of the input device 900 as the input device 900 slides over a support surface, such as a mousepad, contacting the lower portion 916. In at least one example, the grip portion 914 can include an upper curved surface configured to accommodate a user's hand and fingers grasping the input device 900. Also, the lower portion 916 can be planar and configured to rest on and/or support the input device 900 on a support surface when used as a traditional computer mouse, for example on a mouse pad or desktop surface.

In at least one example, the input sensor array 940 can include a plurality of touch input sensors 942 disposed against the interior surface 926 of the housing 912. In at least one example, the touch input sensors 942 can include capacitive touch sensors adhered to or otherwise disposed against the interior surface 926. In this way, the input device 100 can be configured to detect a position of the user's fingers or hand on the grip portion 914 as well as receive signals when the user taps, squeezes, or otherwise contacts the input device 900. The position of the sensor array 940, including each touch input sensor 942, can vary in one or more other examples. For example, other input devices can include a sensor array having touch input sensors disposed against an interior surface of the lower portion 916 or elsewhere on the exterior surface 924 of the housing 912. The input sensors of other devices can also include physical buttons and switches such as TAC switches (e.g., signal switches requiring a touch to open or close a circuit) and buttons physically or mechanically depressed by the user.

Also shown in FIG. 9, the input device 900 can include a feedback module 944. The feedback module 944 can be configured to provide feedback to the user in response to certain input signals given to the input device 900 by the user and or to alert the user of one or more signals sent from a tracking device or computing device controlled by the input device 900. In one example, the feedback module 944 can include a haptic engine that provides tactile feedback in the form of vibrations or other movements of the haptic engine. In at least one example, the feedback module 944 can include visual feedback components such as light emitting components. In at least one example, the feedback module 944 can include one or more speakers providing audio feedback to the user.

As noted above, the sensor array 940 can be configured, in connection with the processor 934, to sense and detect when the user exerts a certain force against the housing 912, for example on the user's squeezes or grips the input device 900 beyond a certain force threshold. Along these lines, the sensor array 940 can include force sensors. That is, one or more of the touch input sensors 942 can include a force sensor configured to detect certain stresses or strains on the housing 912 due to the gripping force of the user as the user handles or manipulates the input device 900.

Also, as noted above, the input device 900 can include an emitter/receiver component such as an antenna 946 electrically coupled to the processor 934. The antenna can also be referred to as an emitter or a receiver. The antenna 946 can be configured to wirelessly send signals to a computing device or tracking device. The signals can include information regarding touches detected by the sensor array 940. The antenna 946 can also be configured to send signals regarding the position, orientation, and movement of the input device 900 in space as the user manipulates the input device 900. The signals can include positions, orientations, and movements detected by an IMU sensor of the input device 900.

Along these lines, and as noted above, the input device 900 can include additional electronic components 948. In at least one example, additional electronic components 948 can include IMU sensors. In at least one example, the electronic component 948 can include memory components or other circuitry components necessary for the functioning of the other components of the input device 900 described herein. In one example, the electronic component 948 of the input device 900 can include a battery to provide wireless power to the input device 900 and various electronic components thereof.

Any of the features, components, and/or parts, including the arrangements and configurations thereof shown in FIG. 9 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 9.

Figure 10:
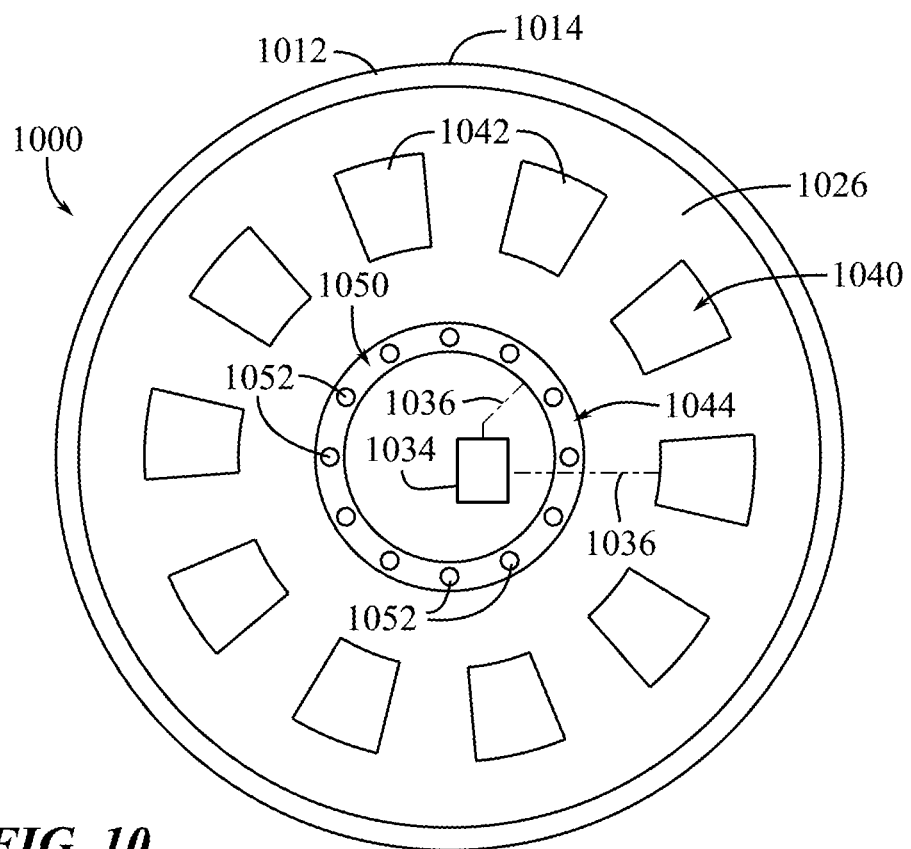
FIG. 10 shows a cross-sectional view of an example of an input device.

FIG. 10 illustrates a cross-sectional view of another example of an input device 1000 showing a plan view of the inside of a grip portion 1014 defined by a housing 1012. The interior surface 1026 of the housing 1012 can define an interior volume where any number of electronic components of the input device 1000 are disposed. The illustrated input device 1000 of FIG. 10 includes a sensor array 1040 including a plurality of input touch sensors 1042 disposed on or against the interior surface 1026 of the housing 1012. In addition, similar to the input device 900 shown in FIG. 9, the input device 1000 shown in FIG. 10 can include a feedback module 1044. The feedback module 1044 can include a light array 1050 having a plurality of lights 1052 disposed in the internal volume and/or near, adjacent to, or against the interior surface 1026 of the housing 1012.

The input device 1000 can also include a processor 1034 electrically coupled to the sensor array 1040 and the feedback module 1044 via one or more wires or circuitry components 1036 illustrated in dotted lines in FIG. 10. The light array 1050, including individual lights 1052, of the feedback module 1044 can be configured to visually indicate different messages or signals to the user as the user manipulates the input device 1000 while controlling visual images on a computing device as described herein.

Figure 11:
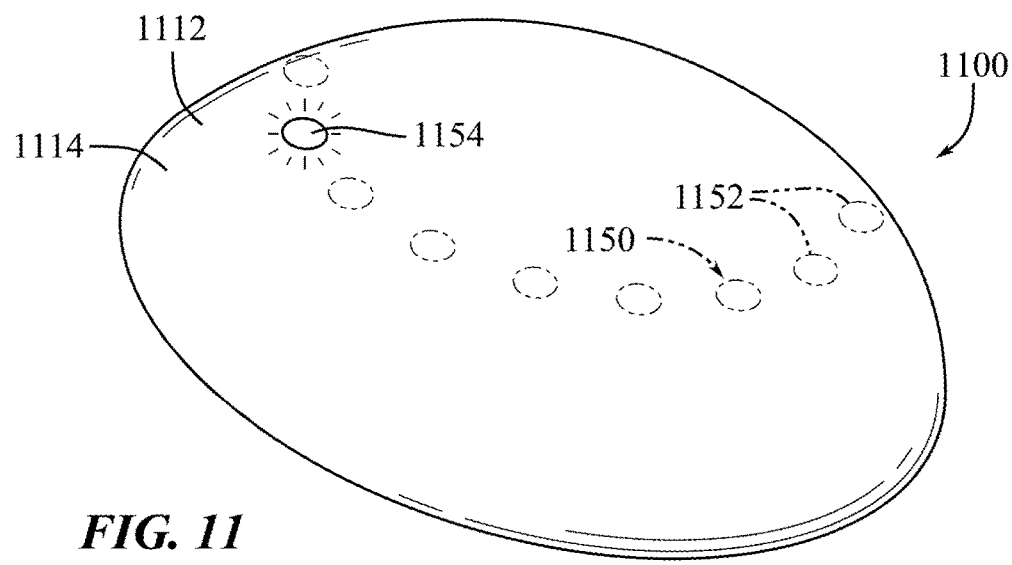
FIG. 11 shows a top, perspective view of an example of an input device.

FIG. 11 illustrates another example of an input device 1100 similar to the input device 1000 shown in FIG. 10 from an external perspective view. The input device 1100 can include a housing 1112 having a grip portion 1114. The input device 1100 can also include a light array 1150 including individual lights 1152 configured to shine light through the housing 1112, which in at least one example can be transparent or semi-transparent. A visible signal 1154 of at least one of the lights 1152 can shine through the housing 1112 as shown in FIG. 11. Any one of the lights 1152 or all the lights of the light array 1150 can individually or simultaneously emit light to the housing 1112 to provide visual feedback to the user of the input device 1100. In at least one example, each of the individual lights 1152 of the light array 1150 can emit different colors of light. In at least one example, the timing of the light emission from each of the lights 1152 of the light array 1150 can be synchronized and choreographed to appear as if light emitted from the light array 1150 is moving back and forth or in any direction or pattern based on the positions of the lights 1152. As noted above, the light array 1150 can be one example of a feedback module configured to communicate and provide feedback to the user.

The light emitted from the light array 1150, and the different forms of the light emitted as discussed above, can be configured to communicate different messages and signals from the computing device controlled by the input device 1100 or from the input device 1100 itself. Signals from the light array 1150 can communicate certain statuses or actions displayed on a display screen of a computing device. Also, different light emitted from the light array 1150 can communicate that certain gestures or actions performed by the user with the input device 1100 have been received and confirmed and/or sent to the computing device as control signals. In one example, if the user squeezes the input device 1100 with a force passing a certain threshold as detected by the various force sensors or touch input sensors described in other examples, the light array 1150 can emit a certain number, type, or color of light from the light 1152 to confirm to the user that the grip force of the user has exceeded the threshold and an object displayed by a computing device on a display screen can be moved by moving the input device 1100. Conversely, once the user is done manipulating the visual object via the input device 1100, the user can reduce a grip force on the input device below the threshold, without completely releasing the input device, to indicate an intent to stop manipulating the visual object while still holding the input device 1200. This intent can be confirmed to the user via the light array 1150.

In another example, light emitted by the light array 1150 can confirm or communicate to the user that an operational mode of the input device 1100 has changed. For example, a first operational mode can include the input device 1100 placed on a support surface where certain movements and manipulations on that surface can be interpreted to control an image on the computing device. Then, when the user lifts the input device 1100 off the support surface, the light array 1150 can indicate to the user that a 3D motion tracking operational mode has been activated. In this mode, the user knows that he or she can manipulate the input device 1100 in 3D spaced to control the visual object on the computing device. One will appreciate that variations and configurations of light emitted by the light array 1150 can vary from one example to another to communicate any number of messages to the user. In addition, while the light array 1150 and 1050 shown in FIGS. 11 and 10, respectively, shown as a feedback module, other feedback modules described herein can also be used to communicate and provide feedback to the user. These other feedback modules can include speakers and haptic feedback mechanisms, including haptic engines. In at least some examples, a combination of the various feedback modules described herein can all be included in a single input device and used to provide haptic feedback, audible feedback, and visual feedback to the user.

Figure 12:
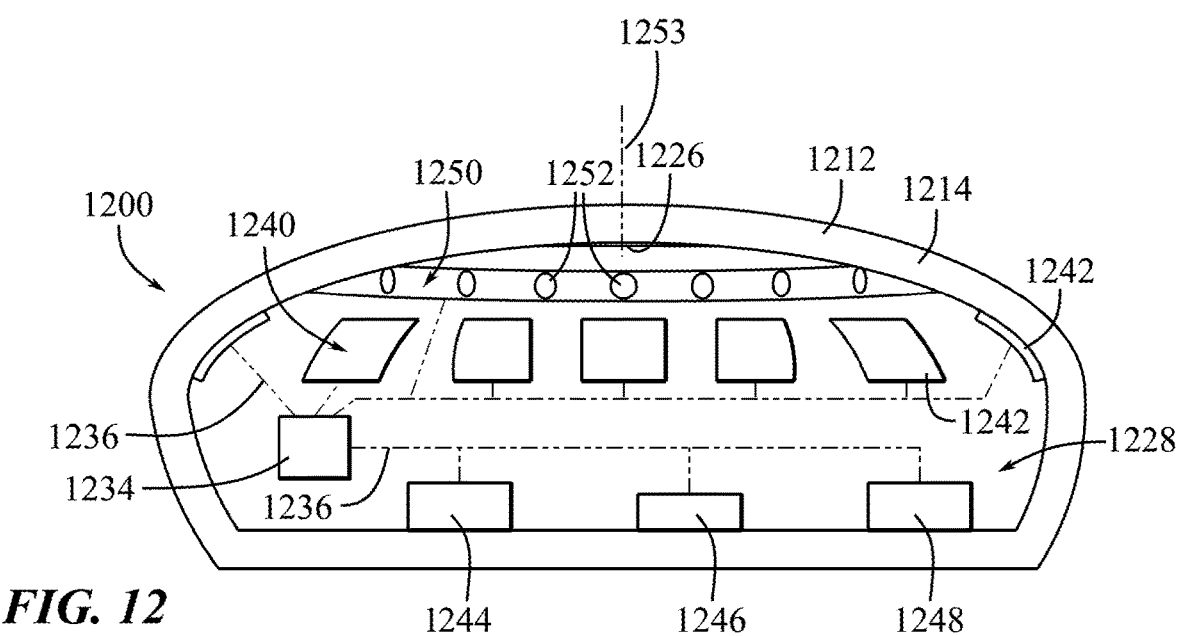
FIG. 12 shows a cross-sectional view of an example of an input device.

FIG. 12 illustrates a cross-sectional view of another example of an input device 1200 similar to that shown in FIGS. 10 and 11. The input device 1200 shown in FIG. 12 can include a housing 1212 including a grip portion 1214. The housing 1212 can include an interior surface 1226, with the interior surface 1226 defining an interior volume 1228. The input device 1200 can include a feedback module 1244, including any type a feedback module described elsewhere herein with reference to other examples, and a light array 1250 including multiple lights 1252 disposed against an interior surface 1226 of the housing 1212.

In addition, the input device 1200 can include a sensor array 1240 including a plurality of touch input sensors 1242 disposed against the interior surface 1226 of the housing 1212. The touch input sensors 1242 can include capacitive touch elements or other types of touch sensors configured to detect the presence and/or position of one or more fingers or palm regions of a user's hand as the user holds or grips the input device 1200. The sensor array 1240 can also include one or more force sensors to detect grip forces, movement of the grip, or other forces acting on the housing 1212 during use. In addition, the input device 1200 can include a number of other electronic components including other feedback modules 1244, antennas (emitters/receivers) 1246, and other sensors or components 1248 including IMU sensors, batteries, and so forth. The input device 100 can also include a processor 1234 electrically coupled to the other electronic components via one or more wires or circuitry component 1236 illustrated in dotted lines in FIG. 12.

In at least one example, the housing 1212 is symmetric (e.g., rotationally symmetric) about the central axis 1253 oriented generally perpendicular to a surface on which the input device 1200 can rest or be manipulated. For example, the housing 1212 can be circular with the central axis 1253 being a central axis of rotation and/or symmetry of the input device 1200. In at least one example, the user can initially grasp the input device 1200, including the housing 1212 thereof, in any orientation and have the input device 1200 be oriented as intended by the user based on the user's grip or hand position regardless of the actual orientation of the input device 1200, as described herein. In such an example, the processor 1234 can be electrically coupled to the sensor array 1240 and determine the hand position and intended orientation of the input device 1200 based on the hand position of the user grasping the housing 1212 via the sensor array 1240.

In at least one example, the housing 1212 of the input device 1200 is circular or domed as shown in FIG. 12 such that the housing 1212 can be rotated about the central axis 1253 serving as a central axis of rotation of the circular housing 1212. In such an example, mouse is agnostic to the actual orientation of the housing 1212 relative to a support surface on which the housing 1212 rests. Rather, the housing 1212 can be oriented and/or re-oriented digitally or computationally by the processor 1234 based on the hand position of the user, as detected by the sensor array 1240, without the need to physically move or rotate the input device 1200 upon grasping the housing 1212.

Any of the features, components, and/or parts, including the arrangements and configurations thereof shown in FIGS. 10-12 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 10-12.

Figure 13A:
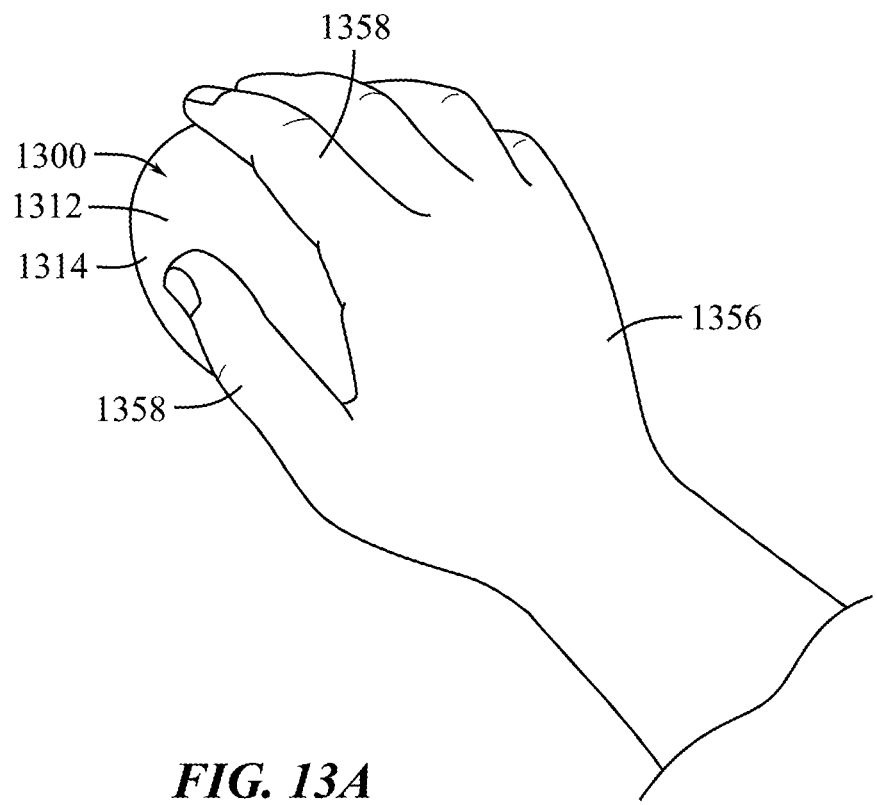
FIG. 13A shows a user's hand grasping and manipulating an example of an input device.

FIG. 13A illustrates another example of an input device 1300, which can be similar to the input devices 1000, 1100, 1200 shown in FIGS. 10-12, or any other input device shown in other figures described herein. The input device 1300 shown in FIG. 13Aa can include a grip portion 1314. FIG. 13A shows a user's hand 1356 with multiple fingers 1358 contacting or gripping the input device 1300. Similar to other examples of input devices described herein, the input device 1300 of FIG. 13A can include touch input sensors and sensor arrays configured to detect the presence and location of contact between the user's hand 1356 and a grip portion 1314 of the input device 1300. The input device 1300 can also be configured to detect contact between the user's hand 1356 and any other portion of the input device 1300 other than the grip portion 1314, for example a lower portion or other side portions of the housing. In addition, as noted above with reference to other examples, the input device 1300 can include one or more force sensors to detect a grip force, grip movement, or other force from the fingers 1358 or other portions of the user's hand 1356 exerted on the housing 1312.

Figure 13B:
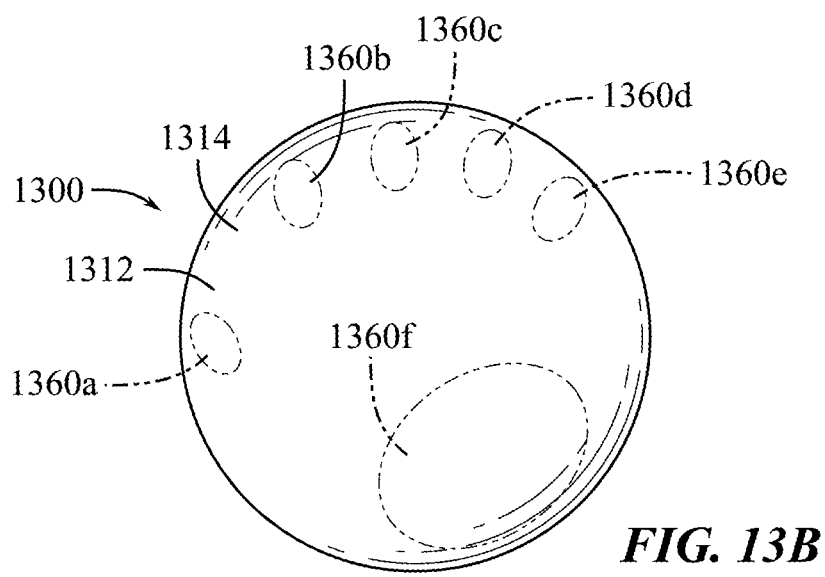
FIG. 13B shows a top view of the input device shown in FIG. 13A with contact regions indicating where portions of the user's hand contact the input device.

FIG. 13B illustrates a top view of the input device 1300 shown in FIG. 13A. The top view of FIG. 13B illustrates regions 1360*a-f* on the grip portion 1314 of the housing 1312 where the user's hand 1356 or fingers 1358 are contacting the housing 1312. In the illustrated example, the regions 1360 *a-e* represent five fingertip contact locations from the user's hand 1356 and the region 1360*f* can represent an area of the user's palm contacting the housing 1312. The illustrated touch configuration is exemplary only and not limiting. Other examples can include a user contacting or gripping the input device 1300 with two fingers, three fingers, with or without palm contact, and so forth. The user can grip the input device 1300 any way he or she chooses and, as noted above, the input device 1300 can be equipped with the variety and plurality of sensors configured to detect where, how, and with what force the user grips the input device 1300. In some examples, the way in which the user grips the input device 1300, as detected by the sensors determining the regions 1360 *a-f* as shown in FIG. 13B, can change an operational mode or functionality of the input device 1300.

For example, the processor of the input device 1300 can execute machine learning algorithms stored on a memory component of the input device 1300 to learn, over time, when a certain combination of touch regions 1360 *a-f* indicate a certain intent of the user. In one example, the user gripping the input device 1300 in a certain way on a support surface can indicate an intent to control a visual object on a computing device while the input device 1300 rests on the support surface. Another configuration of detected contact regions 1360 *a-f* can indicate an intent of the user to grip and manipulate the input device 1300 in 3D space without resting on a support surface to control an object on a display screen of a computing device. In some examples, such determinations of user intent can be based on predetermined touch regions 1360 *a-f* as learned by the user. In any case, the input devices described herein can be configured to detect the position of the user's hand 1356 as the user grips the input device 1300 and manipulates the input device 1300 to control a visual object on a display screen of a computing device with the input device either on a support surface or in 3D space.

Any of the features, components, and/or parts, including the arrangements and configurations thereof shown in FIGS. 13A-13B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 13A-13B.

Figure 14A:
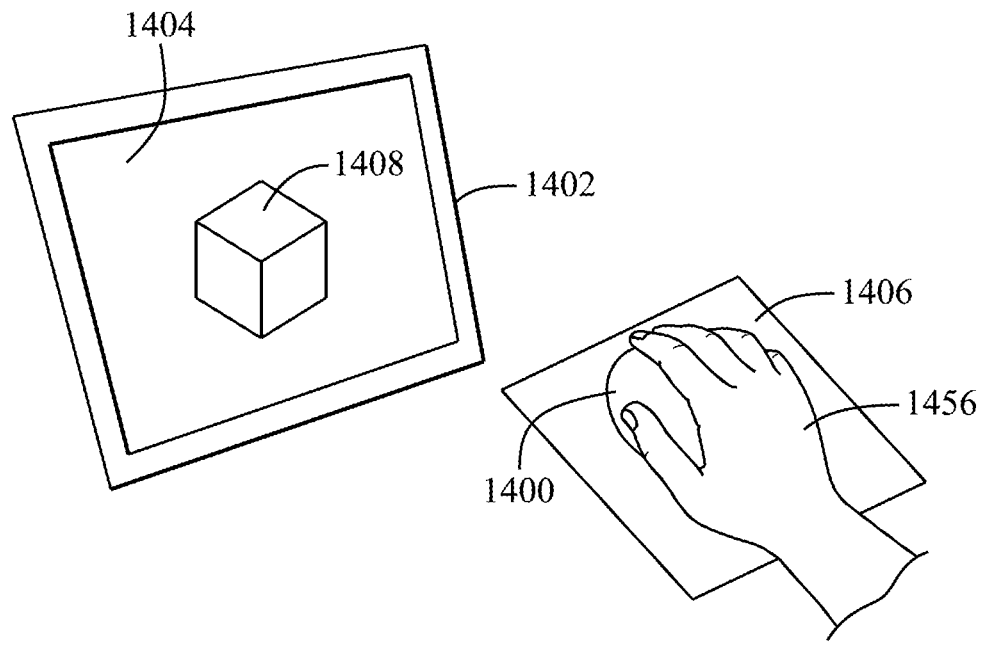
FIG. 14A shows a user controlling a visual object on a display by manipulating an example of an input device resting on a support surface.

Along these lines, FIG. 14A illustrates a user's hand 1456 manipulating an input device 1400 on a support surface 1406 to control and manipulate a visual object 1408 presented by a display screen 1404 of a computing device 1402. The input device 1400 shown in FIG. 14 *a* can be similar to and include any of the components and features of any other input device described herein and shown in other figures. Accordingly, the input device 1400 can be configured to also be lifted off the support surface 1406 and manipulated in 3D space as it is grasped and handled by the user's hand 1456 shown in FIG. 14B. The various arrows illustrated next to the input device 1400 in FIG. 14B indicate various motions, including translational and rotational motions of the input device 1400, as caused by the user. Also as seen in FIG. 14B, the visual object 1408 displayed on the display screen 1404 of the computing device 1402 can move in like manner as indicated by the corresponding arrows indicating various translational and rotational motions of the visual object 1408 on the display screen 1404.

Figure 14B:
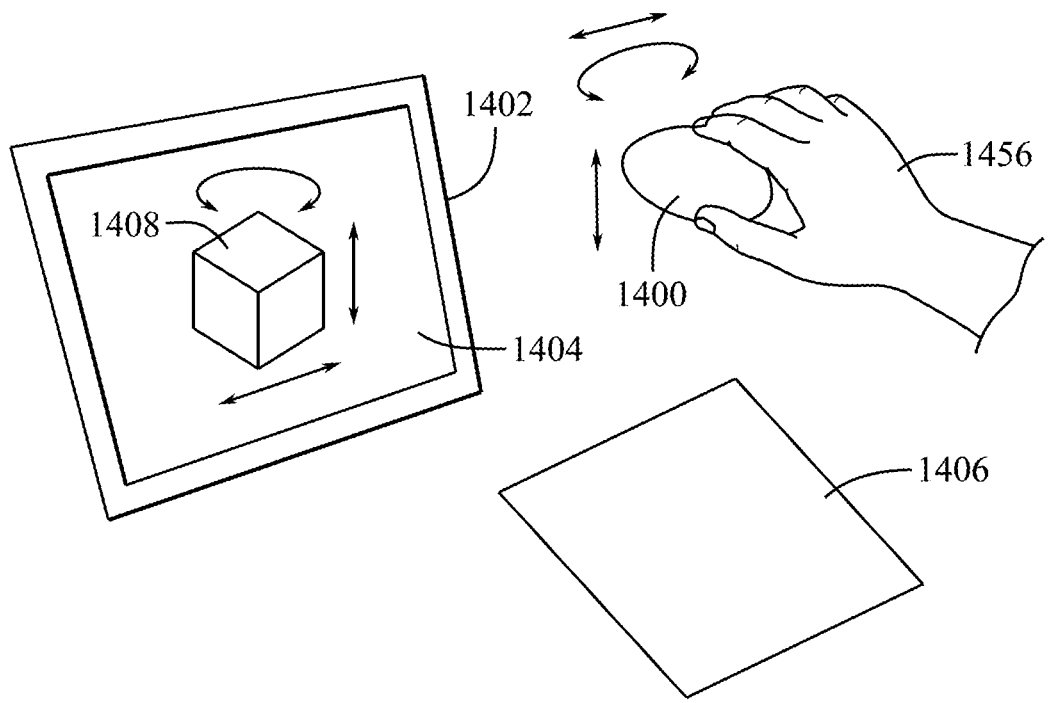
FIG. 14B shows a user controlling a visual object on a display by manipulating the input device shown in FIG. 14A above the support surface in 3D space.

The computing device/display device 1402 shown in FIGS. 14A and 14B can include any or all of the features of components of other computing devices, tracking devices and systems, and display devices shown in other figures and described elsewhere herein. That is, the computing device 1402 can include a plurality of ultrasonic microphones and IMU sensors described with reference to other examples and shown in other figures. In this way, the computing device 1402 can track the position of the input device 1400 in 3D space as the user manipulates the input device 1400. The arrows indicating motion on the display screen 1404 and next to the input device 1400 in FIG. 14B are for illustrative and explanation purposes only and may not be included in some examples of display screens and input devices.

The input device 1400 can include sensors to detect when the user is sliding or manipulating the input device 1400 against a support surface 1406 and when the user lifts the input device 1400 off the support surface 1406 and into the air in 3D space. As noted above, certain feedback module mechanisms can confirm to the user in which mode the input device 1400 is operating. As shown in FIG. 14B, as the user's hand 1456 grips the input device 1400 and moves the input device 1400 in any direction or orientation in 3D space, the visual object 1408 represented on the display screen 1404 of the computing device 1402 can be moved in the same way in virtual 3D on the 2D display screen 1404. In this way, the user can perceive grasping the visual object 1408 as he or she is actually grasping the input device 1400. Accordingly, the user can move and manipulate the visual object 1408 just as he or she would or does move or manipulate the input device 1400 in reality. In this way, the manipulation and control of the visual object 1408 displayed by the display screen 1404 is natural and intuitive.

In addition to these natural and intuitive control scenarios provided by the input devices described herein, including the input device 1400 shown in FIGS. 14A and 14B, the input device 1400 can include additional functionalities enabled by various force sensors, IMU sensors, touch detection arrays, and so forth, to enhance the functionality of the input device 1400 beyond just the manipulation of the visual object 1408 in 3D. For example, the user's hand 1456 can grip the input device 1400 beyond a certain gripping force threshold to virtually grasp and release the visual object 1408. Also, for example, because the display device 1402 can be equipped with the tracking systems having ultrasonic microphones detecting the position of the input device 1400 relative to the display screen 1404, the user can move the input device 1400 closer or further away from the display screen 1404 to zoom in and out of the visual object 1408. Other motions, gestures, and input command scenarios enabled by the sensors of the input devices described herein, which are not all described, are also contemplated.

Any of the features, components, and/or parts, including the arrangements and configurations thereof shown in FIGS. 14A-14B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 14A-14B.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A tracking system, comprising:
   an input device comprising:
   an input sensor;
   a housing having an interior surface defining an internal volume;
   an inertial measurement unit (IMU) sensor disposed in the internal volume;
   an ultrasonic speaker disposed in the internal volume; and
   a laptop or desktop computing device, the laptop or desktop computing device comprising a display screen portion and a base portion configured to rest on a support surface when in use; and
   a tracking assembly comprising a plurality of ultrasonic microphones configured to removably couple to at least the display screen portion of the laptop or desktop computing device and to detect a position of the input device relative to the laptop or desktop computing device based only on output from the ultrasonic speaker and the IMU sensor.

2. The tracking system of claim 1, wherein the ultrasonic speaker is configured to output sound waves greater than about 20 kHz.

3. The tracking system of claim 1, further comprising a feedback module.

4. The tracking system of claim 3, wherein the feedback module includes a haptic engine or a light.

5. The tracking system of claim 1, further comprising an emitter electrically coupled to the IMU sensor.

6. The tracking system of claim 5, wherein the emitter is configured to send signals comprising information regarding a motion or an orientation of the input device detected by the IMU sensor.

7. The tracking system of claim 1, wherein the input sensor comprises a touch detection sensor.

8. The tracking system of claim 7, wherein:
   the housing is circular about a central axis;
   the input device further comprises a processor electrically coupled to the touch detection sensor; and
   the processor is configured to determine an intended orientation of the housing based on a hand position of a user detected by the touch detection sensor.

9. A tracking system, comprising:
   a display portion secured to a base, the display portion including a display screen;
   an input device comprising an ultrasonic speaker configured to output data;
   an array of ultrasonic microphones disposed on the display portion configured to receive the data from the ultrasonic speaker;
   a sensor disposed on the display portion and configured to detect an angle of the display screen relative to the base; and
   a processor configured for determining a position based on the data collected by the array of ultrasonic microphones and the detected angle of the display screen.

10. The tracking system of claim 9, wherein:
    the array of ultrasonic microphones includes three microphones defining a first plane; and
    the array of ultrasonic microphones includes a fourth microphone disposed out of the first plane.

11. The tracking system of claim 10, wherein the display screen defines a second plane parallel to the first plane.

12. The tracking system of claim 10, wherein:
    the display portion is a first portion, and the tracking system further includes a second portion rotatably secured to the first portion; and
    the fourth microphone is disposed on the second portion.

13. The tracking system of claim 12, wherein the second portion includes a keyboard.

14. The tracking system of claim 12, wherein the angle comprises the angle of the display screen relative to a major plane of the second portion.

15. A three-dimensional control system, comprising:
    an input device comprising:
    an input sensor;
    an inertial measurement unit (IMU) sensor; and
    an ultrasonic speaker;
    a computing device including a display portion and a base;
    an array of at least three ultrasonic microphones fixed to the display portion, the array of at least three ultrasonic microphones being configured to receive ultrasonic waves output by the ultrasonic speaker, wherein at least three ultrasonic microphones of the array of at least three ultrasonic microphones lie in a first plane; and
    at least one ultrasonic microphone fixed to the base and lying in a second plane;
    wherein the computing device is configured such that combined output from the IMU sensor and the ultrasonic speaker, when received by the computing device, is sufficient to detect a position of the input device relative to the computing device.

16. The three-dimensional control system of claim 15, the display portion includes a display screen.

17. The three-dimensional control system of claim 16, wherein the IMU sensor is a first IMU sensor and the 3D control system further includes a second IMU sensor secured to the display portion.

18. The three-dimensional control system of claim 15, wherein the input device includes an emitter configured to send signals including information regarding motion detected by the IMU sensor to the computing device.

19. The three-dimensional control system of claim 15, wherein the computing device includes a laptop computer and the input device is operable as a mouse for the laptop computer.

* * * * *